United States Patent
Barak (10) Patent No.: US 10,169,642 B2
(45) Date of Patent: Jan. 1, 2019

(54) SYSTEMS AND METHODS FOR FACE ALERT

(71) Applicant: Facebook, Inc., Menlo Park, CA (US)

(72) Inventor: Dan Barak, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 781 days.

(21) Appl. No.: 14/452,820

(22) Filed: Aug. 6, 2014

(65) Prior Publication Data

US 2016/0042225 A1 Feb. 11, 2016

(51) Int. Cl.
*G06K 9/00* (2006.01)
*G06F 17/30* (2006.01)

(52) U.S. Cl.
CPC ... *G06K 9/00288* (2013.01); *G06F 17/30247* (2013.01); *G06F 17/30268* (2013.01); *G06K 9/00677* (2013.01)

(58) Field of Classification Search
CPC ............ G06K 9/00288; G06K 9/00677; G06F 17/30247; G06F 17/30268
See application file for complete search history.

(56) References Cited

U.S. PATENT DOCUMENTS

| | | | | |
|---|---|---|---|---|
| 2009/0324022 | A1* | 12/2009 | Sangberg | G06F 17/30265 382/118 |
| 2011/0093361 | A1* | 4/2011 | Morales | G06Q 10/087 705/26.62 |
| 2012/0266081 | A1* | 10/2012 | Kao | G06Q 50/01 715/751 |
| 2013/0110802 | A1* | 5/2013 | Shenoy | G06F 17/30876 707/706 |
| 2013/0211889 | A1* | 8/2013 | Hanina | G06Q 30/02 705/14.11 |

* cited by examiner

*Primary Examiner* — Chan Park
*Assistant Examiner* — Elisa Rice
(74) *Attorney, Agent, or Firm* — Sheppard Mullin Richter & Hampton LLP (57) ABSTRACT

Various embodiments described herein notifying users regarding photos in which they may appear and suggest photo tags accordingly. Subject to user preferences and privacy settings, facial recognition with respect to a specific user of a social networking system may be performed on one or more photos added by, or otherwise associated with, other entities of the social networking system. For those photos in which the specific user is facially recognized, a suggested photo tag for the specific user may be associated with the recognized photos and the specific user may be alerted accordingly. Depending on the embodiment, the specific user may be provided with an option to confirm the suggested photo tag, decline the suggested photo tag, or do nothing. In the event the specific user declines the suggested photo tag with respect to a particular photo, other users may be prevented from tagging the specific user with respect to the particular photo.

19 Claims, 6 Drawing Sheets

SYSTEMS AND METHODS FOR FACE ALERT

FIELD OF THE INVENTION

The present application relates to multimedia tagging and, in particular, notifying a user of possible tags in photos and other visual multimedia in which the user is recognized.

BACKGROUND

Social networks provide a dynamic environment in which members can connect to and communicate with other members. Information typically shared through the environment include text-based messages and images (e.g., graphics, photographs, and videos), which are generally added, uploaded, sent, or posted to the social network from its various members. In connection with the images received by them, social networks are often capable of receiving member-provided information that is intended to be associated with the images, such as member commentary and information that identifies or otherwise relates to objects depicted in the image. For example, where a photograph is received by a social network, the social network may also receive information from one or more members that relates to the subject matter depicted in the photograph, such as keywords describing depicted individuals.

The act of using keywords to describe an image or other multimedia is often referred to as "tagging" (e.g., tagging individuals in a photograph, also referred to as "tagging an image"). Traditionally, images and other visual multimedia posted on social networks have been manually tagged through tagging features provided by social networks and utilized by members. The experience of social network members may be enhanced by the presentation of images or other visual multimedia that convey the additional contextual information reflected in tags.

SUMMARY

To allow for enhancing user experience on a social networking system, embodiments of the invention include systems, methods, and computer readable media configured to facilitate enhanced photo tagging mechanisms.

In various aspects of the present disclosure, systems, methods, and non-transitory computer-readable media are provided that identify a set of candidate entities associated with a user, identify a set of photos associated with the set of candidate entities, perform a facial recognition process on the set of photos to identify in the set of photos a subset of photos in which the user is recognized by the facial recognition process, generate for the subset of photos a set of suggested photo tags associated with the user, wherein each suggested photo tag in the set of suggested photo tags identifies the user in a respective photo in the subset of photos as identified by the facial recognition process, and receive a set of user responses with respect to the set of suggested photo tags.

In some embodiments, the set of candidate entities comprises one or more entities having an associated profile on a social networking system.

In some embodiments, the set of candidate entities comprises at least one of members of a social networking system, member groups of the social networking system, organizations on the social networking system, places posted on the social networking system, or events posted on the social networking system.

In some embodiments, the set of candidate entities are obtained from social graph data that supports a social networking system.

In some embodiments, the systems, methods, or non-transitory computer-readable media operate based on authorization by the user. The authorization by the user may be provided by a set of user privacy settings associated with the user. In some embodiments, the systems, methods, or non-transitory computer-readable media identify the set of user privacy settings associated with the user.

In some embodiments, the systems, methods, or non-transitory computer-readable media present the subset of photos and set of suggested photo tags to the user through a graphical user interface.

In some embodiments, the set of user responses comprises the user confirming or declining one or more tags in the set of suggested photo tags.

In some embodiments, the set of user responses comprises the user selecting to take no action with respect to one or more tags in the set of suggested photo tags.

In some embodiments, the facial recognition process is based on a face recognition template associated with the user.

In some embodiments, the subset of photos comprises one or more photos in which the user was recognized by the facial recognition process at a confidence level that meets or exceeds a minimum threshold of confidence.

In some embodiments, the systems, methods, or non-transitory computer-readable media alert the user regarding the set of suggested photo tags.

In some embodiments, the set of photos comprises one or more photos each having an associated date that is on or after a predetermined date.

In some embodiments, the set of photos comprises one or more photos each having an associated time that is on or after a predetermined time.

In some embodiments, the systems, methods, or non-transitory computer-readable media save one or more tags in the set of suggested photo tags based on the set of user responses.

In some embodiments, the systems, methods, or non-transitory computer-readable media remove one or more tags in the set of suggested photo tags based on the set of user responses.

In some embodiments, the systems, methods, or non-transitory computer-readable media prevent another user of the social networking system from tagging the user in one or more photos in the subset of photos.

In some embodiments, the systems, methods, or non-transitory computer-readable media operate periodically or based on an event associated with the user.

In some embodiments, systems, methods, and non-transitory computer-readable media described herein are performed on a set of multimedia items other than, or in addition to, photos, and a set of tags associated with the user are generated for one or more in the set of multimedia items accordingly.

In some embodiments, systems, methods, and non-transitory computer-readable media described herein may recognize users in a set of multimedia items using methods other than, or in addition to, facial recognition.

Many other features and embodiments of the invention will be apparent from the accompanying drawings and from the following detailed description.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

The various embodiments described herein relate to notifying users regarding photos in which they may appear and suggesting photo tags accordingly. Subject to user preferences and privacy settings, facial recognition with respect to a specific user of a social networking system may be performed on one or more photos added (e.g., uploaded) by, or otherwise associated with, other entities of the social networking system. Examples of entities of the social networking system can include members (e.g., users) of the social networking system, member groups (e.g., user groups) of the social networking system, organizations on the social networking system, places posted on the social networking system, or events posted on the social networking system. An entity of a social networking system may have an associated profile on the social networking system to which the entity may add (e.g., upload) and associate photos.

For those photos in which the specific user is facially recognized (e.g., at or above a predetermined level of confidence), a suggested photo tag for the specific user may be associated with the recognized photos and the specific user may be alerted accordingly. Depending on the embodiment, the specific user may be provided with an option to confirm the suggested photo tag, decline the suggested photo tag, or do nothing. In the event the specific user declines the suggested photo tag with respect to a particular photo, other users (e.g., the user who uploaded or otherwise added the photo) may be prevented from tagging the specific user with respect to the particular photo. The photos subject to facial recognition, photo tag suggestion, and alerting may vary, and may include, for example, those uploaded by the specific user's friends, those uploaded by another user with whom the specific user crossed paths, those associated with an event or location at which the specific user has been, and those associated with a group or organization with which the specific user is associated.

Though various embodiments are described herein in the context of recognizing users in photos and generating tag suggestions accordingly, in some embodiments, users can be recognized in multimedia items other than, or in addition to, photos and a set of tags associated with the user can be generated for one or more in the set of multimedia items accordingly. For instance, systems, methods, and non-transitory computer-readable media described herein may be performed on a set of videos to identify in the set of videos a subset of videos in which the user is recognized. Additionally, though various embodiments are described herein in the context of recognizing users in photos using facial recognition, in some embodiments, users can be recognized in various multimedia items using methods other than, or in addition to, facial recognition. For instance, for video items in a set of multimedia items, systems, methods, and non-transitory computer-readable media described herein may utilize facial recognition, voice recognition, and body part recognition (e.g., poselets) to recognize a user in the video items. As another example, for audio items in the set of multimedia items, systems, methods, and non-transitory computer-readable media described herein may utilize voice recognize a user in the audio item. The method or methods used to recognize a user in a given multimedia item may vary according to the multimedia type.

As used herein, the act of suggesting tags (or tag suggestion) can refer to the acts of recognizing a user in a multimedia item using a method of user recognition (e.g., facial recognition, body part recognition/poselets, voice recognition, etc.) and providing multimedia tag suggestions (e.g., photo tag suggestions or video tag suggestions) based on the user recognition.

Figure 1:
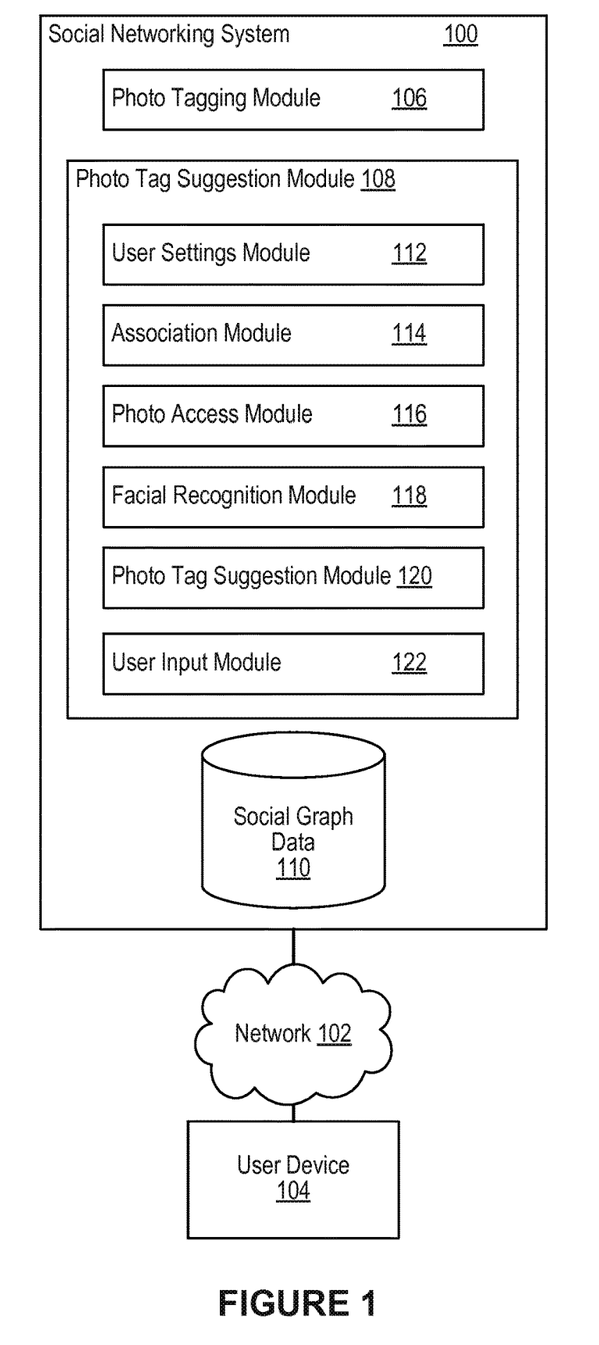
FIG. 1 illustrates an example system for using photo tag suggestion in a social networking system in accordance with an embodiment of the invention.

FIG. 1 illustrates an example system for using photo tag suggestion in a social networking system 100 in accordance with an embodiment of the invention. The social networking system 100 can be configured to communicate with one or more user devices and one or more external systems through one or more network connections. For illustrative purposes, FIG. 1 depicts the embodiment of the social networking system 100 communicatively coupled to a single user device 104 by way of a network 102, thereby permitting data communication between the social networking system 100 and the user device 104 over the network 102, as discussed in more detail below.

In FIG. 1, the social networking system 100 includes a photo tagging module 106, a photo tag suggestion module 108, and social graph data 110 stored on a computer-readable datastore. In an embodiment of the invention, the social networking system 100 may include additional, fewer, or different components for various applications. Some components are not shown so as to not obscure relevant details. In some embodiments, the photo tagging module 106 enables or otherwise assists a user of the social networking system 100 in associating one or more tags with one or more photos added, uploaded, sent, posted, or otherwise provided to the social networking system 100. For some embodiments, the photo tagging module 106 may assist the photo tag suggestion module 108 with associating a user with one or more photo tags that the photo tag suggestion module 108 has detected and suggested for a set of photos on the social networking system 100.

As understood herein, a "tag" can comprise one or more terms or keywords that can be associated with any aspect relating to a photo. As also understood herein, the act of "tagging" a photo can comprise the act of associating one or more tags with that photo. Once associated with a photo, a tag can be used to describe the photo and can further be used to organize, sort, and locate the photo when the photo is part of a larger collection of photos. Commonly used examples of tags can include, for example, names of individuals (e.g., those individuals depicted in the photo or present at the location of photo), subjects or topics relating to the subject matter depicted in the photo, the location of the photo, the time or date of the photo, classification or categorization of the photo, contextual information about the photo, or any other references related to any aspect of the photo. In the context of social networks, tags may commonly include names of members of a social network, which may also include the name of the user performing the photo tagging action and connections of the user.

In some embodiments, a tag may be associated with a photo such that the association applies to the photo in general (e.g., applies to the photo as a whole) or to particular points or regions within the content presented by the photo. The latter of these tag types may be referred to as an "XY" tag, as the tag refers to one or more Cartesian coordinates in the content presented by the photo. Another example of a tag type includes a "mention" tag, which generally associates a photo with a social network member, regardless of whether the social network member is depicted in the content presented by the photo. Yet another example of a tag type includes a "with" tag, which identifies a social network member as being present at the time or location of the photo, regardless of whether the social network member is depicted in the content presented by the photo.

Associations formed between photos and tags can be maintained by the social networking system 100, for example, in the social graph data 110 supporting the social networking system 100. Associations may be maintained by the social networking system 100 such that a user can view, retrieve, or modify the associations, and can use the associations to locate or organize photos in the social networking system 100 based on tags. For some embodiments, tag associations can be included as part of the metadata of a photo.

The photos to be tagged can include those posted to the social networking system 100 by, or otherwise associated with, various entities of the social networking 100 including, but not limited to, members (e.g., users) of the social networking system 100, member groups (e.g., user groups) of the social networking system 100, organizations on the social networking system 100, places posted on the social networking system 100, or events posted on the social networking system 100. The posted photo may be stored in the social networking system 100 or stored on an external system accessible by the social networking system 100. A tag, once associated with a photo, may be presented through the social networking system 100 as part of a description of the photo, such as a caption, commentary, or an overlay associated with the photo (e.g., mouse-over caption).

To enable a user to perform photo tagging actions, especially with respect to photo tags provided by the photo tag suggestion module 108, the photo tagging module 106 may provide a user interface that enables or otherwise assists the user in associating a photo with one or more tags. For instance, the photo tagging module 106 may provide a user with a graphical user interface (GUI) that permits a user to review or otherwise browse a set of suggested photo tags, associated with the user and provided by the photo tag suggestion module 108, for a set of photos uploaded by other users on the social networking system 100. For some embodiments, the GUI may permit the user to confirm, decline, or take no action with respect to the set of suggested photo tags provided by the photo tag suggestion module 108. The set of suggested photo tags provided by the photo tag suggestion module 108 may be associated with points or regions in the set of photos that are intended to correspond with the user's location in the set of photos. Where the user wishes to modify one or more suggested photo tags in the set of suggest photo tags (e.g., regions associated with a suggested photo tag), the user may do so through the GUI provided by the photo tagging module 106.

The GUI may also permit the user to enter tags of the user's own choosing or to browse through and select from a list of pre-selected tags available for association with the photo. Through the GUI, a user may select a point or region within the content presented by a photo and then enter or select one or more tags that the user intends to associate with the selected point or region. After selection of the point or region, the photo tagging module 106 may prompt the user to enter a user-defined tag. For example, where a user of the social networking system 100 may intend to associate an individual depicted in a photo with a tag, the user may select a point or region in the photo intended to correspond with the individual (e.g., the individual's face or body) and, subsequently, enter a name for the individual or select one from a list of social network members.

The photo tag suggestion module 108 may be configured to recommend photo tags in a set of photos of the social networking system 100 using facial recognition, and providing the set of photo tags for the set of photos. In some embodiments, the photo tag suggestion module 108 provides a set of suggested photo tags for a set of photos added (e.g., uploaded) by, or otherwise associated with, entities of the social networking system, such as other users of the social networking system, user groups of the social networking system, organizations on the social networking system, places posted on the social networking system, events posted on the social networking system, and the like. As shown in FIG. 1, the photo tag suggestion module 108 includes a user settings module 112, an association module 114, a photo access module 116, a facial recognition module 118, a photo tag suggestion module 120, and a user input module 122.

The user settings module 112 may be configured to access information relating to user settings or preferences provided by the social networking system 100 in association with a user, including one or more user privacy settings associated with the user. In some embodiments, the user privacy settings may alter, restrict, or prevent certain operations of the photo tag suggestion module 108. For instance, where a user privacy setting indicates that the user wishes to restrict or prevent facial recognition of his or her face in photos on the social networking system 100, the photo tag suggestion module 108 may be prevented from detecting and providing suggested photo tags for photos newly added by entities associated with the user. In another instance, the user privacy settings or preferences may indicate that the user wishes to limit the activities of the photo tag suggestion module 108 to only those photos added to the social networking system 100 in the past week, or to only those photos added by entities associated with the user by a specific type of connection (e.g., only friends and not acquaintances). The user settings module 112 may provide the settings it identifies or otherwise obtains from the social networking system 100 to one or more other components of the photo tag suggestion module 108. The user settings or preferences may be stored in the user's profile, which may in turn be maintained in the social graph data 110.

The association module 114 may be configured to identify one or more candidate entities of the social networking system 100 associated with a specific user and may do so in accordance with on one or more user settings provided by the user settings module 112. Entities of the social networking system 100 can include one or more members (e.g., users) of a social networking system, member groups (e.g., user groups) of the social networking system, organizations on the social networking system, places posted on the social networking system, events posted on the social networking system, and the like. For some embodiments, the candidate entities identified by the association module 114 can include another user with whom the specific user crossed paths, another user who shares connections with one or more user to which the user is associated, another user associated with an event or location at which the specific user has been, and another user associated with a group or organization with which the specific user is associated. Information regarding the candidate entities of the social networking system 100 may be obtained by the association module 114 from the social graph data 110.

The photo access module 116 may be configured to receive information regarding the set of candidate entities of the social networking system 100 identified by the association module 114 and identify or obtain from the social networking system 100 a set of photos associated with the set of candidate entities. In some embodiments, the set of photos identified or obtained may include photos added to the social networking system 100 by the set of candidate entities, or photos associated with the set of candidate entities on the social networking system 100 (e.g., photos in which the candidate entities were tagged by another user). For some embodiments, the set of photos associated with the set of candidate entities may be obtained from the social graph data 110.

The facial recognition module 118 may be configured to perform a facial recognition process on one or more faces of individuals depicted in a photo that a user is intending to tag. In this way, the facial recognition module 118 may identify a subset of photos, in the set of photos identified by the photo access module 116, in which the user may appear. For some embodiments, facial recognition signatures and characteristics may assist the facial recognition module 118 with identifying a given face of the user on photos of the social networking system 100. For example, the facial recognition module 118 may utilize a face recognition template associated with the user to identify the subset of photos in the set of photos. Additionally, for some embodiments, the subset of photos provided by the facial recognition module 118 may include photos that meet or exceed a minimum threshold of confidence with respect to recognizing the user. As described herein, the facial recognition module 118 may perform a facial recognition process in accordance with user setting or preferences (e.g., user privacy settings) provided by the user settings module 112.

The photo tag suggestion module 120 may be configured to generate a set of suggested photo tags for the subset of photos identified by the facial recognition module 118. For some embodiments, the photo tag suggestion module 120 may generate XY tags based on the results of the facial recognition module 118, where the XY tags correspond with the specific user's location in each photo in the subset of photos provided by the facial recognition module 118. Before the set of suggested photo tags are saved (e.g., committed to the social graph data 110), the photo tag suggestion module 120 may provide the set of suggested photo tags to the user input module 122 to elicit a response from the user with respect to one or more of the set of suggested photo tags.

The user input module 122 may be configured to present or otherwise provide the user with the set of suggested photo tags generated by the photo tag suggestion module 120. The user input module 122 may utilize a graphical user interface, such as the one provided by the photo tagging module 106, to request responses from the user with respect to the set of suggested photo tags. In some embodiments, the user input module 122 may provide the user with a set of response options for one or more of the set of suggested photo tags. As described herein, example response from the user may include, but are not necessarily limited to, confirming one of the suggested photo tags, declining (e.g., rejecting) one of the suggested photo tags, or taking no action with respect to one of the suggested photo tags. Where the user confirms one of the suggested photo tags, that one suggested photo tag may be saved to the social graph data 110 in association with its respective photo.

It will be appreciated that in some embodiments, the user may be sent a notification (e.g., a pop-up alert on the user device 104) regarding one or more suggested photo tags as the photo tag suggestion module 120 generates the suggested photo tags, after a predetermined number of suggested photo tags has been generated, based on the user's login status (e.g., user has not logged in a few weeks), or some other condition.

Figure 2:
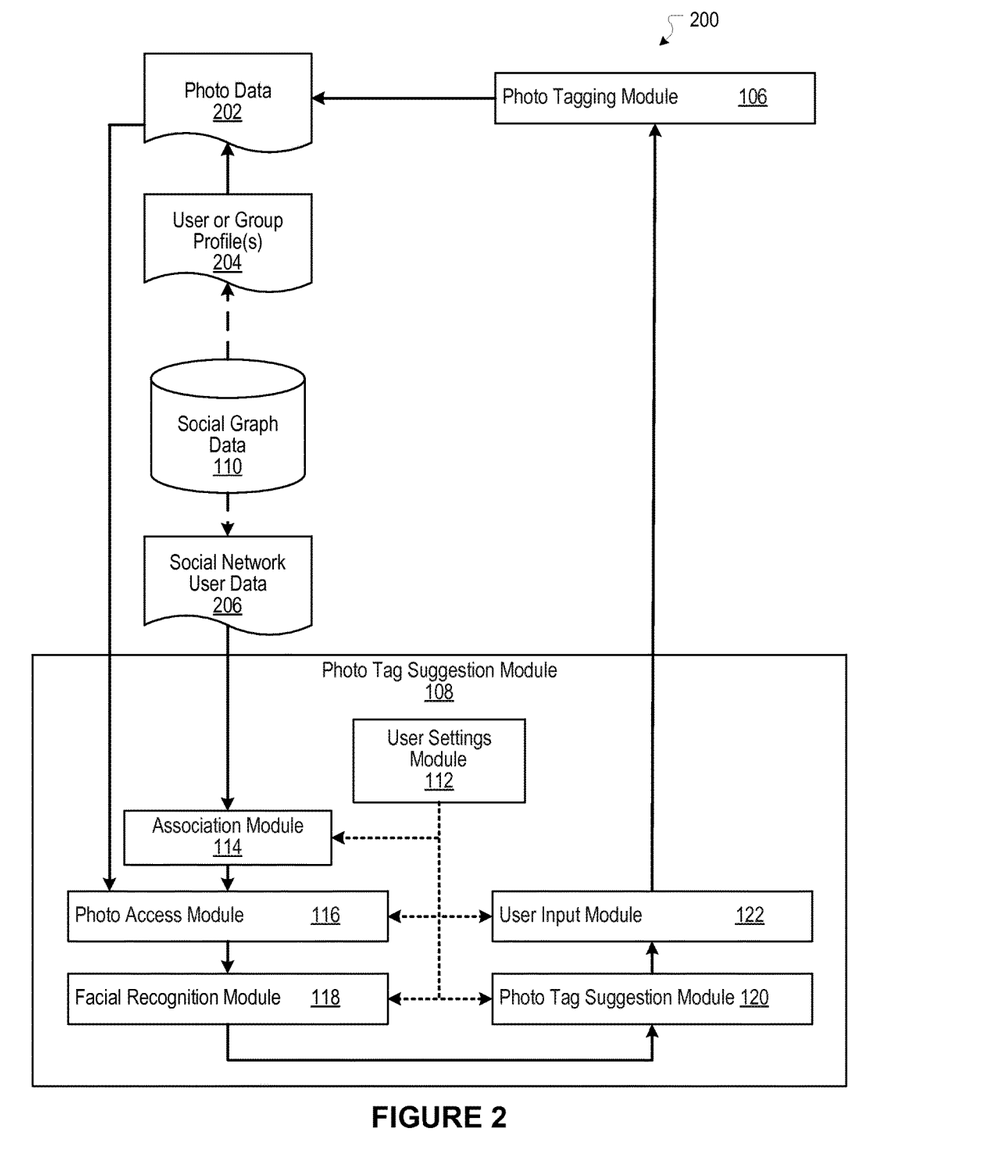
FIG. 2 illustrates an example data flow in an example system for photo tag suggestion in a social networking system in accordance with an embodiment of the invention.

FIG. 2 illustrates an example data flow 200 in an example system for photo tag suggestion in a social networking system in accordance with an embodiment of the invention. In particular, the data flow 200 illustrates an example data flow between components of a social networking system, such as the social networking system 100 of FIG. 1. The data flow 200 as illustrated involves the photo tagging module 106, the photo tag suggestion module 108 and its various components, the social graph data 110, photo data 202, user or group profile(s) 204, and social network user data 206. The data flow for various embodiments may differ from the data flow 200 in flow, sequence, or the components involved. In accordance with various embodiments described herein, the data flow 200 may commence in advance or upon a specific user signing into the social networking system 100 (e.g., the social networking system 100), or when an entity associated with the user (e.g., another user or organization) uploads, adds, or is otherwise associated with a photo on the social networking system 100.

As described herein, the user settings module 112 may identify or otherwise obtain from the social networking system 100 a set of user settings associated with a specific user, and may provide the set of user settings to various components of the photo tag suggestion module 108, including one or more of the association module 114, the photo access module 116, the facial recognition module 118, the photo tag suggestion module 120, and the user input module 122.

Identifying or otherwise obtaining the set of user settings may comprise identifying or otherwise obtaining a set of user privacy settings associated with the specific user. In some embodiments, the set of user privacy settings may comprise the specific user's preferences with respect to privacy of personal information, which can include their preferences for automatic facial recognition of the specific user's face in photos uploaded or added to the social networking system 100 by other entities (e.g., other users associated with the specific user). The specific user's preferences with respect to privacy of personal information can further include the user's preferences with respect to which entities the association module 114 can access, which photos the photo access module 116 can access, what photo tag suggestions are provided by the photo tag suggestion module 120, and whether the user input module 122 should provide an automatic response to the set of suggested photo tags provided by the photo tag suggestion module 120.

In the data flow 200, the association module 114 may identify one or more candidate entities of the social networking system 100 associated with a specific user and may do so based on one or more user settings provided by the user settings module 112. As described herein, entities of the social networking system 100 can comprise one or more members of a social networking system, member groups of the social networking system, organizations on the social networking system, places posted on the social networking system, or events posted on the social networking system. Depending on the embodiment, the candidate entities identified can include another user with whom the specific user crossed paths, another user who shares connections with one or more user to which the user is associated, another user associated with an event or location at which the specific user has been, and another user associated with a group or organization with which the specific user is associated. The candidate entities of the social networking system 100 associated with the specific user may be identified using the social network user data 206 provided by the social graph data 110. As described herein, the social graph data 110 may support the social networking system 100 and may maintain associations between the specific user and other entities of the social networking system 100.

The photo access module 116 may be configured to receive information regarding the set of candidate entities of the social networking system 100 identified by the association module 114 and identify or obtain from the social networking system 100 a set of photos associated with the set of candidate entities. In some embodiments, the photo access module 116 may identify or obtain the set of photos from photo data 202 included in the user or group profile(s) 204 obtained from the social graph data 110. The user or group profile(s) 204 may comprise one or more profiles associated with various entities of the social networking system 100, such as users, user groups, and organizations on the social networking system 100. As photos are added or uploaded by entities of the social networking system 100, the photos, data regarding the photos, or both may be added to the user or group profile(s) 204 as photo data 202. The photo data 202 may include information regarding one or more photo tags associated with a given photo on the social networking system 100.

For some embodiments, the set of photos identified or obtained by the photo access module 116 may be limited to a certain date or time. In some embodiments, the photo access module 116 can limit the set of photos to those that were recently added by, or associated with, a given candidate entity. For example, the photo access module 116 may limit the set of photos to only those that were added in the last day, week or month. In this way, the specific user can be alerted or otherwise notified of only those photos having recent relevance to the specific user (e.g., as opposed to photos added to the social networking system 100 long ago or ones that the specific user may no longer wish to be alerted about). The date and time parameters by which the photo access module 116 identifies or obtains the set of photos may be determined according to user settings provided by the user settings module 112.

The facial recognition module 118 may be configured to perform facial recognition of the specific user on the set of photos identified or obtained by the photo access module 116, and to identify from the set of photos a subset of photos in which the specific user may appear. As described herein, the facial recognition module 118 may utilize a facial recognition process that utilizes the specific's user facial template to identify a subset of photos, in the set of photos, in which the specific user is recognized with at least a minimum level of confidence. Accordingly, the subset of photos may include only photos in which the facial recognition process recognizes the specific user at or above a specific level of confidence.

Subsequently, the results of the facial recognition module 118 may be utilized by the photo tag suggestion module 120 to generate a set of suggested photo tags for the subset of photos identified by the facial recognition module 118. For some embodiments, the photo tag suggestion module 120 may generate XY tags based on the results of the facial recognition module 118, where the XY tags correspond with the specific user's position in each photo in the subset of photos provided by the facial recognition module 118.

The photo tag suggestion module 120 may provide the set of suggested photo tags to the user input module 122, which would permit the specific user to provide a response with respect to the each of the set of suggested photo tags. In some embodiments, the specific user may provide their response with respect to each of the set of suggested photo tags through a graphical user interface (GUI), which may present the set of suggested photo tags in connection with their corresponding photos from the subset of photos.

As a response, the specific user may confirm one or more of the suggested photo tags, thereby causing the photo tagging module 106 to save those suggested photo tags in the photo data 202 (in association with their corresponding photos). For some embodiments, the specific user may decline or choose to explicitly take no action with respect to the suggested photo tags. In some such embodiments, other entities (e.g., other) users may be prevented from tagging the specific user in the photo corresponding to those suggested photo tags the specific user declined or chose to take no action. Such restriction may be saved to the photo data 202, or some other part of the social graph data 110, and may be saved by the photo tagging module 106.

Figure 3:
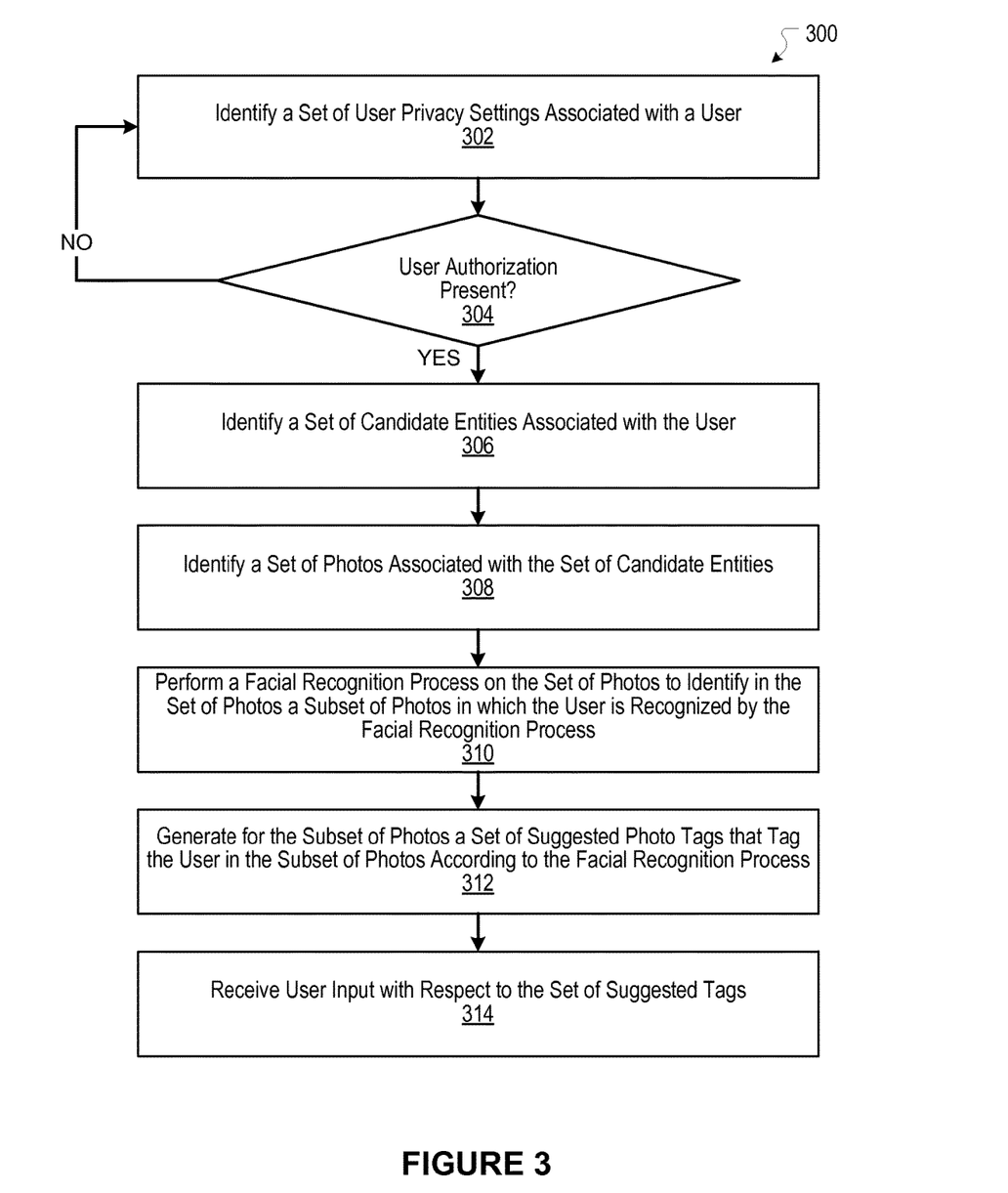
FIG. 3 illustrates an example process for photo tag suggestion in accordance with an embodiment of the invention.

FIG. 3 illustrates an example process 300 for photo tag suggestion in accordance with an embodiment of the invention. In an embodiment, the social networking system described in connection with FIG. 3 may be implemented as the social networking system 100. For some embodiments, the process 300 may be performed periodically and may further be performed with respect to a user while the user is logged into the social networking system 100 (e.g., from a client device) or while the user is logged out of the social networking system 100 (e.g., the user is offline). In some embodiments, the process 300 may be invoke in connection with an event, such as the user logging into the social networking system 100, or when an entity of the social networking system 100 associated with the user (e.g., a friend of the user on the social networking system 100) adds a new photo to the social networking system 100.

The process may begin at block 302, with a set of user privacy settings associated with a user being identified. As described herein, for some embodiments, the user's privacy settings may restrict or prevent performance of various operations of the process 300 including, but not limited to, facial recognition operations with respect to the user. In doing so, the process 300 can respect a user's preferences with regard to automatically detecting and suggesting photo tags to the user.

At block 304, if user authorization is present in the set of user privacy settings associated with the user, the process 300 may proceed with other operations of the process 300. If, however, the user authorization is not present in the set of user privacy settings associated with the user, the process 300 may return to block 302 to identify the current set of user privacy setting and check if the user authorization has changed with respect to permitting process 300 to be performed.

At block 306, a set of candidate entities associated with the user may be identified. As described herein, entities of the social networking system 100 can include, but are not limited to, members (e.g., users) of the social networking system 100, member groups (e.g., user groups) of the social networking system 100, organizations on the social networking system 100, places posted on the social networking system, or events posted on the social networking system 100. The candidate entities may be friends or acquaintances of the user on the social networking system 100, or may be entities associated with the user on the social networking system 100 based on crossed paths, an event or location at which the user has been, or an association the user has with a group or organization. Associations between the candidate entities and the user may be based on information maintained by social graph data supporting the social networking system (e.g., the social graph data 110).

At block 308, a set of photos associated with the set of candidate entities may be identified. In some embodiments, the set of photos identified may include photos added to the social networking system 100 by the set of candidate entities, or photos associated with the set of candidate entities on the social networking system 100 (e.g., photos in which the candidate entities were tagged by another user).

At block 310, a facial recognition process may be performed on the set of photos to identify in the set of photos a subset of photos in which the user is recognized by the facial recognition process. Depending on the embodiment, facial recognition signatures and characteristics associated with the user may assist the facial recognition process with identifying a given face of the user in the set of photos.

At block 312, a set of suggested photo tags, which tag the user in the subset of photos according to the facial recognition process, are generated for the subset of photos. As described herein, the set of suggested photo tags may comprise XY tags that correspond with the user's location in each photo in the subset of photos.

At block 314, user input may be received with respect to the set of suggested photo tags. The set of suggested photo tags may be presented for user review and response. Example response from the user may include, but are not necessarily limited to, confirming one of the suggested photo tags, declining (e.g., rejecting) one of the suggested photo tags, or taking no action with respect to one of the suggested photo tags.

Figure 4:
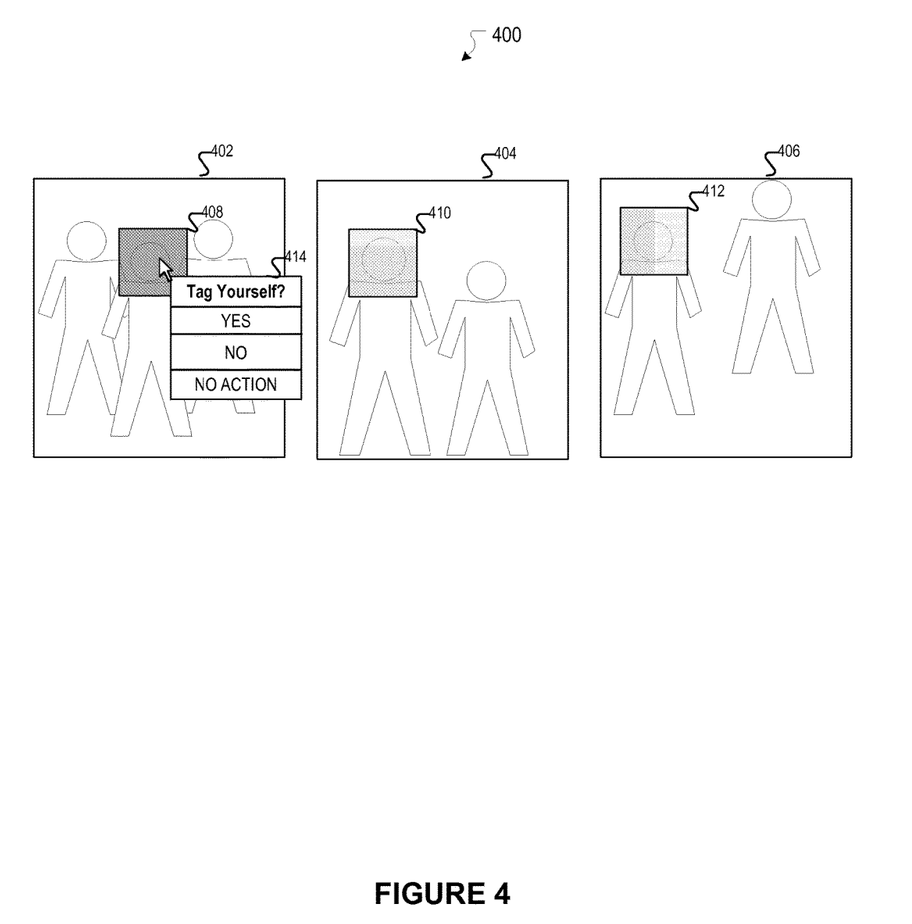
FIG. 4 illustrates an example graphical user interface for photo tag suggestion in a social networking system in accordance with an embodiment of the invention.

FIG. 4 illustrates an example graphical user interface (GUI) 400 for photo tag suggestion in a social networking system in accordance with an embodiment of the invention. In particular, the GUI 400 may be one presented through the user device 104 by the social networking system 100 when a user of the user device 104 is viewing one or more photos 402, 404, and 406 associated with a set of photo tags detected and suggested by the social networking system 100 (e.g., by the photo detection and suggestion module 108) for the user. According to some embodiments, the interface 400 permits the user to review the photos 402, 404, and 406 and the set of suggested photo tags and provide a response with respect to one or more of the set of suggested photo tags. For some embodiments, more or less photos may be presented to the user for review than those shown in FIG. 4.

As illustrated, the photos 402, 404, and 406 may be respectively presented with regions 408, 410, and 412 that are associated with the suggested photo tags and that correspond to the user's location in those photos. As described herein, the facial recognition process utilized in detecting the photo tags may provide information regarding the position or region of the user in the photos it selects as containing with the user. To respond to one of the suggested photo tags, the user may select one of the regions 408, 410, or 412 and be presented with options for response. For example, as shown, the user may select the region 408 and be presented with a response menu 414 (e.g., "Tag Yourself?"), which allows the user to confirm (e.g., "Yes"), decline (e.g., "No"), or take no action (e.g., "No Action") with respect to the suggested photo tag associated with the region 408.

Figure 5:
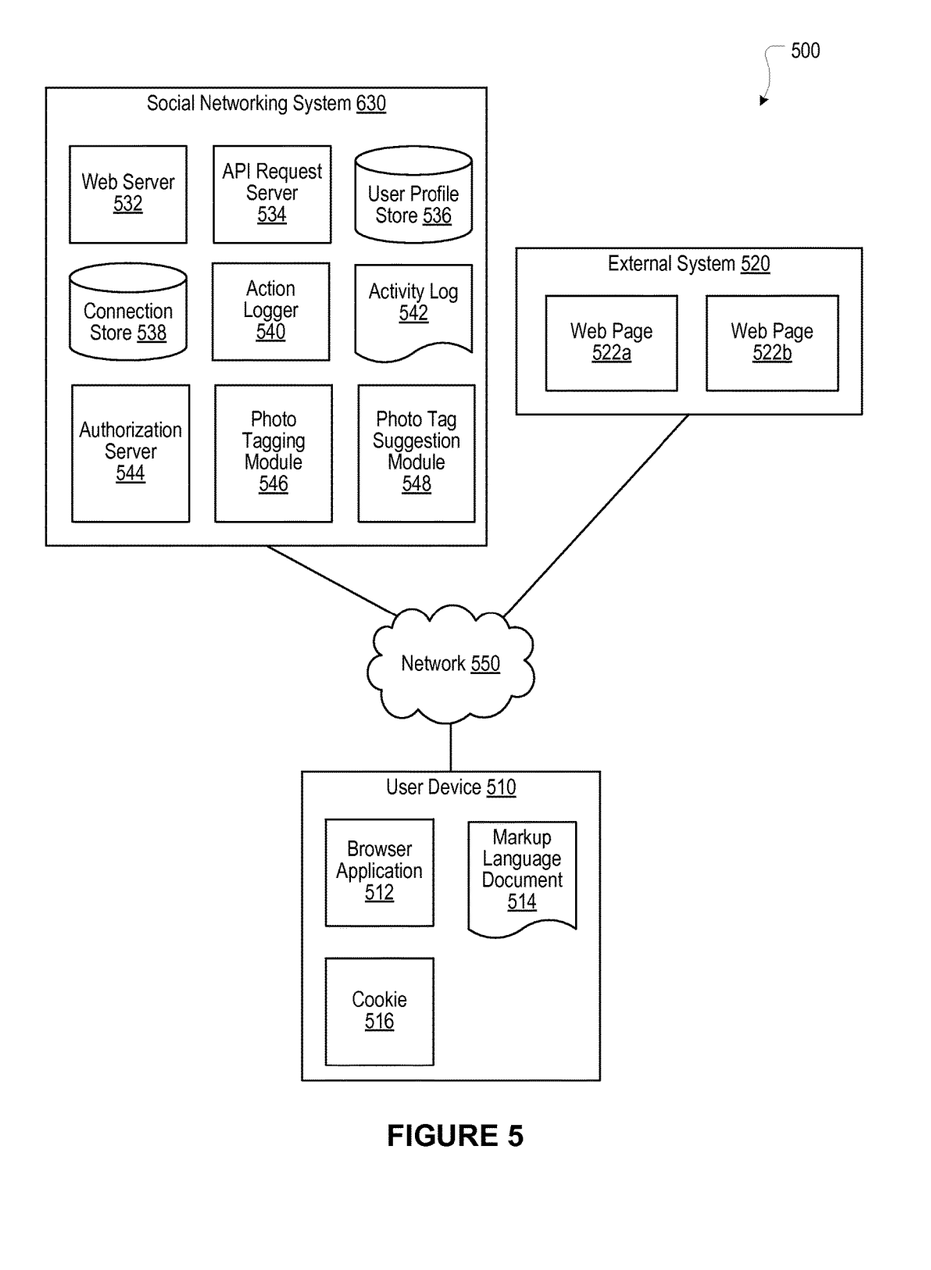
FIG. 5 is a network diagram of an example system for photo tag suggestion in a social networking system in accordance with an embodiment of the invention.

FIG. 5 is a network diagram of a system 500 for photo tag suggestion in a social networking system 530 in accordance with an embodiment of the invention. In an embodiment, the social networking system 100, the photo tagging module 106, and the photo tag suggestion module 108 may be implemented in or as the social networking system 530. The system 500 includes one or more user devices 510, one or more external systems 520, the social networking system 530, and a network 550. For purposes of illustration, the embodiment of the system 500, shown by FIG. 5, includes a single external system 520 and a single user device 510. However, in other embodiments, the system 500 may include more user devices 510 and more external systems 520. In certain embodiments, the social networking system 530 is operated by a social network provider, whereas the external systems 520 are separate from the social networking system 530 in that they may be operated by different entities. In various embodiments, however, the social networking system 530 and the external systems 520 operate in conjunction to provide social networking services to users (or members) of the social networking system 530. In this sense, the social networking system 530 provides a platform or backbone, which other systems, such as external systems 520, may use to provide social networking services and functionalities to users across the Internet.

The user device 510 comprises one or more computing devices that can receive input from a user and transmit and receive data via the network 550. In one embodiment, the user device 510 is a conventional computer system executing, for example, a Microsoft Windows compatible operating system (OS), Apple OS X, and/or a Linux distribution. In another embodiment, the user device 510 can be a device having computer functionality, such as a smart-phone, a tablet, a personal digital assistant (PDA), a mobile telephone, etc. The user device 510 is configured to communicate via the network 550. The user device 510 can execute an application, for example, a browser application that allows a user of the user device 510 to interact with the social networking system 530. In another embodiment, the user device 510 interacts with the social networking system 530 through an application programming interface (API) provided by the native operating system of the user device 510, such as iOS and ANDROID. The user device 510 is configured to communicate with the external system 520 and the social networking system 530 via the network 550, which may comprise any combination of local area and wide area networks, using wired and/or wireless communication systems.

In one embodiment, the network 550 uses standard communications technologies and protocols. Thus, the network 550 can include links using technologies such as Ethernet, 502.11, worldwide interoperability for microwave access (WiMAX), 3G, 4G, CDMA, GSM, LTE, digital subscriber line (DSL), etc. Similarly, the networking protocols used on the network 550 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 550 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 510 may display content from the external system 520 and/or from the social networking system 530 by processing a markup language document 514 received from the external system 520 and from the social networking system 530 using a browser application 512. The markup language document 514 identifies content and one or more instructions describing formatting or presentation of the content. By executing the instructions included in the markup language document 514, the browser application 512 displays the identified content using the format or presentation described by the markup language document 514. For example, the markup language document 514 includes instructions for generating and displaying a web page having multiple frames that include text and/or image data retrieved from the external system 520 and the social networking system 530. In various embodiments, the markup language document 514 comprises a data file including extensible markup language (XML) data, extensible hypertext markup language (XHTML) data, or other markup language data. Additionally, the markup language document 514 may include JavaScript Object Notation (JSON) data, JSON with padding (JSONP), and JavaScript data to facilitate data-interchange between the external system 520 and the user device 510. The browser application 512 on the user device 510 may use a JavaScript compiler to decode the markup language document 514.

The markup language document 514 may also include, or link to, applications or application frameworks such as FLASH™ or Unity™ applications, the SilverLight™ application framework, etc.

In one embodiment, the user device 510 also includes one or more cookies 516 including data indicating whether a user of the user device 510 is logged into the social networking system 530, which may enable customization of the data communicated from the social networking system 530 to the user device 510.

The external system 520 includes one or more web servers that include one or more web pages 522a, 522b, which are communicated to the user device 510 using the network 550. The external system 520 is separate from the social networking system 530. For example, the external system 520 is associated with a first domain, while the social networking system 530 is associated with a separate social networking domain. Web pages 522a, 522b, included in the external system 520, comprise markup language documents 514 identifying content and including instructions specifying formatting or presentation of the identified content.

The social networking system 530 includes one or more computing devices for a social network, including a plurality of users, and providing users of the social network with the ability to communicate and interact with other users of the social network. As described herein, the social network can be represented by a graph, i.e., a data structure including edges and nodes. Other data structures can also be used to represent the social network, including but not limited to databases, objects, classes, meta elements, files, or any other data structure.

Users may join the social networking system 530 and then add connections to any number of other users of the social networking system 530 to whom they desire to be connected. As used herein, the term "friend" refers to any other user of the social networking system 530 to whom a user has formed a connection, association, or relationship via the social networking system 530. For example, in an embodiment, if users in the social networking system 530 are represented as nodes in the social graph, the term "friend" can refer to an edge formed between and directly connecting two user nodes.

Connections may be added explicitly by a user or may be automatically created by the social networking system 530 based on common characteristics of the users (e.g., users who are alumni of the same educational institution). For example, a first user specifically selects a particular other user to be a friend. Connections in the social networking system 530 are usually in both directions, but need not be, so the terms "user" and "friend" depend on the frame of reference. Connections between users of the social networking system 530 are usually bilateral ("two-way"), or "mutual," but connections may also be unilateral, or "one-way." For example, if Bob and Joe are both users of the social networking system 530 and connected to each other, Bob and Joe are each other's connections. If, on the other hand, Bob wishes to connect to Joe to view data communicated to the social networking system 530 by Joe, but Joe does not wish to form a mutual connection, a unilateral connection may be established. The connection between users may be a direct connection; however, some embodiments of the social networking system 530 allow the connection to be indirect via one or more levels of connections or degrees of separation.

In addition to establishing and maintaining connections between users and allowing interactions between users, the social networking system 530 provides users with the ability to take actions on various types of items supported by the social networking system 530. These items may include groups or networks (i.e., social networks of people, entities, and concepts) to which users of the social networking system 530 may belong, events or calendar entries in which a user might be interested, computer-based applications that a user may use via the social networking system 530, transactions that allow users to buy or sell items via services provided by or through the social networking system 530, and interactions with advertisements that a user may perform on or off the social networking system 530. These are just a few examples of the items upon which a user may act on the social networking system 530, and many others are possible. A user may interact with anything that is capable of being represented in the social networking system 530 or in the external system 520, separate from the social networking system 530, or coupled to the social networking system 530 via the network 550.

The social networking system 530 is also capable of linking a variety of entities. For example, the social networking system 530 enables users to interact with each other as well as external systems 520 or other entities through an API, a web service, or other communication channels. As discussed herein, the social networking system 530 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 530. As noted herein, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 530 also includes user-generated content, which enhances a user's interactions with the social networking system 530. User-generated content may include anything a user can add, upload, send, or "post" to the social networking system 530. For example, a user communicates posts to the social networking system 530 from a user device 510. Posts may include data such as status updates or other textual data, location information, images such as photos, videos, links, music or other similar data and/or media. Content may also be added to the social networking system 530 by a third-party. Content "items" are represented as objects in the social networking system 530. In this way, users of the social networking system 530 are encouraged to communicate with each other by posting text and content items of various types of media through various communication channels. Such communication increases the interaction of users with each other and increases the frequency with which users interact with the social networking system 530.

The social networking system 530 includes a web server 532, an API request server 534, a user profile store 536, a connection store 538, an action logger 540, an activity log 542, an authorization server 544, a photo tagging module 546, and a photo tag suggestion module 548. In an embodiment of the invention, the social networking system 530 may include additional, fewer, or different components for various applications. Other components, such as network interfaces, security mechanisms, load balancers, failover servers, management and network operations consoles, and the like are not shown so as to not obscure the details of the system.

The user profile store 536 maintains information about user accounts, including biographic, demographic, and other types of descriptive information, such as work experience, educational history, hobbies or preferences, location, and the like that has been declared by users or inferred by the social networking system 530. This information is stored in the user profile store 536 such that each user is uniquely identified. The social networking system 530 also stores data describing one or more connections between different users in the connection store 538. The connection information may indicate users who have similar or common work experience, group memberships, hobbies, or educational history. Additionally, the social networking system 530 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 530, such as non-person entities, buckets, cluster centers, images, interests, pages, external systems, concepts, and the like are also stored in the connection store 538.

The social networking system 530 maintains data about objects with which a user may interact. To maintain this data, the user profile store 536 and the connection store 538 store instances of the corresponding type of objects maintained by the social networking system 530. Each object type has information fields that are suitable for storing information appropriate to the type of object. For example, the user profile store 536 contains data structures with fields suitable for describing a user's account and information related to a user's account. When a new object of a particular type is created, the social networking system 530 initializes a new data structure of the corresponding type, assigns a unique object identifier to it, and begins to add data to the object as needed. This might occur, for example, when a user becomes a user of the social networking system 530, the social networking system 530 generates a new instance of a user profile in the user profile store 536, assigns a unique identifier to the user account, and begins to populate the fields of the user account with information provided by the user.

The connection store 538 includes data structures suitable for describing a user's connections to other users, connections to external systems 520 or connections to other entities. The connection store 538 may also associate a connection type with a user's connections, which may be used in conjunction with the user's privacy setting to regulate access to information about the user. In an embodiment of the invention, the user profile store 536 and the connection store 538 may be implemented as a federated database.

Data stored in the connection store 538, the user profile store 536, and the activity log 542 enables the social networking system 530 to generate the social graph that uses nodes to identify various objects and edges connecting nodes to identify relationships between different objects. For example, if a first user establishes a connection with a second user in the social networking system 530, user accounts of the first user and the second user from the user profile store 536 may act as nodes in the social graph. The connection between the first user and the second user stored by the connection store 538 is an edge between the nodes associated with the first user and the second user. Continuing this example, the second user may then send the first user a message within the social networking system 530. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 530 (or, alternatively, in an image maintained by another system outside of the social networking system 530). The image may itself be represented as a node in the social networking system 530. This tagging action may create edges between the first user and the second user as well as create an edge between each of the users and the image, which is also a node in the social graph. In yet another example, if a user confirms attending an event, the user and the event are nodes obtained from the user profile store 536, where the attendance of the event is an edge between the nodes that may be retrieved from the activity log 542. By generating and maintaining the social graph, the social networking system 530 includes data describing many different types of objects and the interactions and connections among those objects, providing a rich source of socially relevant information.

The web server 532 links the social networking system 530 to one or more user devices 510 and/or one or more external systems 520 via the network 550. The web server 532 serves web pages, as well as other web-related content, such as Java, JavaScript, Flash, XML, and so forth. The web server 532 may include a mail server or other messaging functionality for receiving and routing messages between the social networking system 530 and one or more user devices 510. The messages can be instant messages, queued messages (e.g., email), text and SMS messages, or any other suitable messaging format.

The API request server 534 allows one or more external systems 520 and user devices 510 to call access information from the social networking system 530 by calling one or more API functions. The API request server 534 may also allow external systems 520 to send information to the social networking system 530 by calling APIs. The external system 520, in one embodiment, sends an API request to the social networking system 530 via the network 550, and the API request server 534 receives the API request. The API request server 534 processes the request by calling an API associated with the API request to generate an appropriate response, which the API request server 534 communicates to the external system 520 via the network 550. For example, responsive to an API request, the API request server 534 collects data associated with a user, such as the user's connections that have logged into the external system 520, and communicates the collected data to the external system 520. In another embodiment, the user device 510 communicates with the social networking system 530 via APIs in the same manner as external systems 520.

The action logger 540 is capable of receiving communications from the web server 532 about user actions on and/or off the social networking system 530. The action logger 540 populates the activity log 542 with information about user actions, enabling the social networking system 530 to discover various actions taken by its users within the social networking system 530 and outside of the social networking system 530. Any action that a particular user takes with respect to another node on the social networking system 530 may be associated with each user's account, through information maintained in the activity log 542 or in a similar database or other data repository. Examples of actions taken by a user within the social networking system 530 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 530, the action is recorded in the activity log 542. In one embodiment, the social networking system 530 maintains the activity log 542 as a database of entries. When an action is taken within the social networking system 530, an entry for the action is added to the activity log 542. The activity log 542 may be referred to as an action log.

Additionally, user actions may be associated with concepts and actions that occur within an entity outside of the social networking system 530, such as an external system 520 that is separate from the social networking system 530. For example, the action logger 540 may receive data describing a user's interaction with an external system 520 from the web server 532. In this example, the external system 520 reports a user's interaction according to structured actions and objects in the social graph.

Other examples of actions where a user interacts with an external system 520 include a user expressing an interest in an external system 520 or another entity, a user posting a comment to the social networking system 530 that discusses an external system 520 or a web page 522a within the external system 520, a user posting to the social networking system 530 a Uniform Resource Locator (URL) or other identifier associated with an external system 520, a user attending an event associated with an external system 520, or any other action by a user that is related to an external system 520. Thus, the activity log 542 may include actions describing interactions between a user of the social networking system 530 and an external system 520 that is separate from the social networking system 530.

The authorization server 544 enforces one or more privacy settings of the users of the social networking system 530. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 520, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 520. One embodiment allows the specification of the set of entities to comprise an enumeration of entities. For example, the user may provide a list of external systems 520 that are allowed to access certain information. Another embodiment allows the specification to comprise a set of entities along with exceptions that are not allowed to access the information. For example, a user may allow all external systems 520 to access the user's work information, but specify a list of external systems 520 that are not allowed to access the work information. Certain embodiments call the list of exceptions that are not allowed to access certain information a "block list". External systems 520 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 544 contains logic to determine if certain information associated with a user can be accessed by a user's friends, external systems 520, and/or other applications and entities. The external system 520 may need authorization from the authorization server 544 to access the user's more private and sensitive information, such as the user's work phone number. Based on the user's privacy settings, the authorization server 544 determines if another user, the external system 520, an application, or another entity is allowed to access information associated with the user, including information about actions taken by the user.

As described above in further detail, the photo tagging module 546 contains logic that enables or otherwise assists a user of the social networking system 530 to associate one or more tags with one or more images, such as photos, supported by the social networking system 530.

As described above in further detail, the photo tag suggestion module 548 contains logic to notify users regarding photos in which they may appear and suggest photo tags accordingly. As described herein, based on user preferences or user privacy settings, facial recognition with respect to a specific user of a social networking system 530 may be performed on one or more photos added by, or otherwise associated with, other entities of the social networking system 530. For those photos in which the specific user is facially recognized, a suggested photo tag for the specific user may be associated with the recognized photos and the specific user may be alerted accordingly. Depending on the embodiment, the specific user may be provided with an option to confirm the suggested photo tag, decline the suggested photo tag, or do nothing. In the event the specific user declines the suggested photo tag with respect to a particular photo, other users may be prevented from tagging the specific user with respect to the particular photo.

Figure 6:
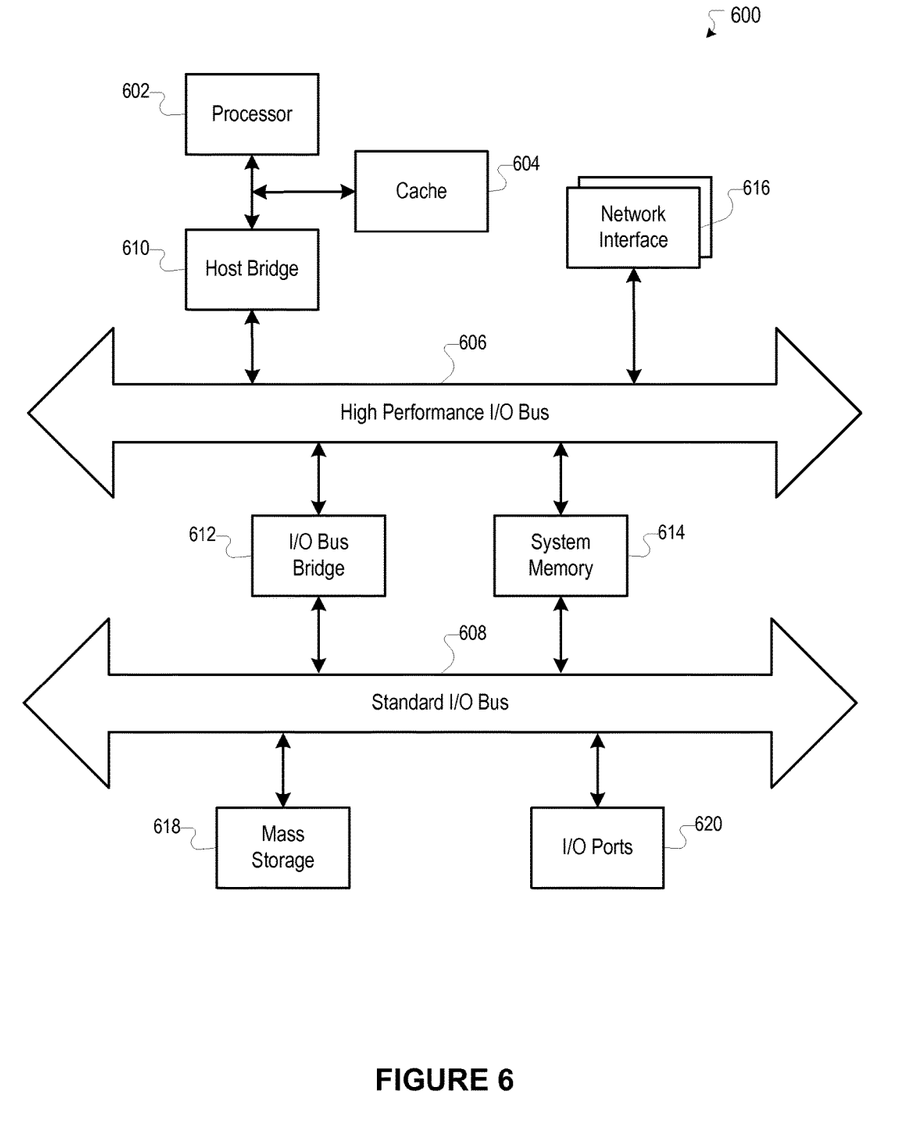
FIG. 6 shows a diagram of a computer system in accordance with an embodiment of the invention.

The foregoing processes and features can be implemented by a wide variety of machine and computer system architectures and in a wide variety of network and computing environments. FIG. 6 illustrates an example of a computer system 600 that may be used to implement one or more of the computing devices identified above. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 630, the user device 610, the external system 620, or a component thereof. In an embodiment of the invention, the computer system 600 may be one server among many that constitutes all or part of the social networking system 630.

The computer system 600 includes a processor 602, a cache memory 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples the processor 602 to the high performance I/O bus 606, whereas I/O bus bridge 612 couples the two buses 606 and 608 to each other. A system memory 614 and one or more network interfaces 616 couple to the bus 606. The computer system 600 may further include video memory and a display device coupled to the video memory (not shown). Mass storage 618 and I/O ports 620 couple to the bus 608. The computer system 600 may optionally include a keyboard and pointing device, a display device, or other input/output devices (not shown) coupled to the bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 which, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614, and then accessed and executed by processor 602. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   identifying, by a computing system, a set of candidate entities associated with a user;
   identifying, by the computing system, a set of photos associated with the set of candidate entities;
   performing, by the computing system, a facial recognition process on the set of photos to identify in the set of photos a subset of photos in which the user is recognized by the facial recognition process, wherein the facial recognition process is performed based on authorization by the user;
   generating, by the computing system, for the subset of photos, a set of suggested photo tags associated with the user, wherein each suggested photo tag in the set of suggested photo tags identifies the user in a respective photo in the subset of photos as identified by the facial recognition process; and
   receiving, by the computing system, from the user, a set of restriction responses with respect to the set of suggested photo tags, wherein the set of restriction responses comprises at least the user selecting to take no action with respect to one or more tags in the set of suggested photo tags.

2. The computer-implemented method of claim 1, wherein the set of candidate entities comprises one or more entities having an associated profile on a social networking system.

3. The computer-implemented method of claim 1, wherein the set of candidate entities comprises at least one of members of a social networking system, member groups of the social networking system, organizations on the social networking system, places posted on the social networking system, or events posted on the social networking system.

4. The computer-implemented method of claim 1, wherein the set of candidate entities are obtained from social graph data that supports a social networking system.

5. The computer-implemented method of claim 1, wherein the computer-implemented method is performed based on authorization by the user.

6. The computer-implemented method of claim 5, wherein the authorization by the user is provided by a set of user privacy settings associated with the user.

7. The computer-implemented method of claim 6, further comprising identifying the set of user privacy settings associated with the user.

8. The computer-implemented method of claim 1, further comprising presenting the subset of photos and set of suggested photo tags to the user through a graphical user interface.

9. The computer-implemented method of claim 1, wherein the set of restriction responses comprises the user confirming or declining one or more tags in the set of suggested photo tags.

10. The computer-implemented method of claim 1, wherein the facial recognition process is based on a face recognition template associated with the user.

11. The computer-implemented method of claim 1, wherein the subset of photos comprises one or more photos in which the user was recognized by the facial recognition process at a confidence level that meets or exceeds a minimum threshold of confidence.

12. The computer-implemented method of claim 1, further comprising alerting the user regarding the set of suggested photo tags.

13. The computer-implemented method of claim 1, wherein the set of photos comprises one or more photos each having an associated date that is on or after a predetermined date.

14. The computer-implemented method of claim 1, wherein the set of photos comprises one or more photos each having an associated time that is on or after a predetermined time.

15. The computer-implemented method of claim 1, further comprising saving one or more tags in the set of suggested photo tags based on the set of restriction responses.

16. The computer-implemented method of claim 1, further comprising preventing another user of the social networking system from tagging the user in one or more photos in the subset of photos.

17. The computer-implemented method of claim 1, wherein the computer-implemented method is performed periodically or based on an event associated with the user.

18. A system comprising:
at least one processor; and
a memory storing instructions configured to instruct the at least one processor to perform:
identifying a set of candidate entities associated with a user;
identifying a set of photos associated with the set of candidate entities;
performing a facial recognition process on the set of photos to identify in the set of photos a subset of photos in which the user is recognized by the facial recognition process, wherein the facial recognition process is performed based on authorization by the user;
generating, for the subset of photos, a set of suggested photo tags that are associated with the user and that tag the user in the subset of photos as identified by the facial recognition process; and
receiving, from the user, restriction input with respect to the set of suggested photo tags wherein the restriction input comprises at least the user selecting to take no action with respect to one or more tags in the set of suggested photo tags.

19. A non-transitory computer storage medium storing computer-executable instructions that, when executed, cause a computer system to perform a computer-implemented method comprising:
identifying a set of candidate entities associated with a user;
identifying a set of photos associated with the set of candidate entities;
performing a facial recognition process on the set of photos to identify in the set of photos a subset of photos in which the user is recognized by the facial recognition process, wherein the facial recognition process is performed based on authorization by the user;
generating, for the subset of photos, a set of suggested photo tags that are associated with the user and that tag the user in the subset of photos as identified by the facial recognition process; and
receiving, from the user, restriction input with respect to the set of suggested photo tags wherein the restriction input comprises at least the user selecting to take no action with respect to one or more tags in the set of suggested photo tags.

* * * * *